(12) United States Patent
Bosworth

(10) Patent No.: US 10,063,042 B2
(45) Date of Patent: Aug. 28, 2018

(54) MOUNTING ASSEMBLY FOR AN ELECTRICAL FIXTURE

(71) Applicant: Ideas to Action, LLC, Massillon, OH (US)

(72) Inventor: Peter A. Bosworth, Massillon, OH (US)

(73) Assignee: Ideas to Action, LLC, Massillon, OH (US)

( * ) Notice: Subject to any disclaimer, the term of this patent is extended or adjusted under 35 U.S.C. 154(b) by 0 days.

(21) Appl. No.: 15/634,658

(22) Filed: Jun. 27, 2017

(65) Prior Publication Data

US 2017/0373482 A1 Dec. 28, 2017

Related U.S. Application Data

(60) Provisional application No. 62/355,321, filed on Jun. 27, 2016.

(51) Int. Cl.
| | | |
|---|---|---|
| *H01R 4/24* | (2018.01) | |
| *H02G 3/18* | (2006.01) | |
| *H01R 13/506* | (2006.01) | |
| *H01R 33/76* | (2006.01) | |

(52) U.S. Cl.
CPC ............ *H02G 3/18* (2013.01); *H01R 13/506* (2013.01); *H01R 33/7607* (2013.01); *H01R 33/7664* (2013.01); *H01R 33/7685* (2013.01)

(58) Field of Classification Search
CPC .......... H02G 3/18; H01R 33/08; H01R 43/26; H01R 33/7667
USPC ........................................................ 439/427
See application file for complete search history.

(56) References Cited

U.S. PATENT DOCUMENTS

| 1,778,062 | A | | 10/1930 | Butzke | |
|---|---|---|---|---|---|
| 3,336,568 | A | | 8/1967 | Plus | |
| 5,422,487 | A | * | 6/1995 | Sauska | ................... C02F 1/325 |
| | | | | | 250/436 |
| 6,250,947 | B1 | * | 6/2001 | Holzer | ............... H01R 33/7657 |
| | | | | | 439/356 |

(Continued)

FOREIGN PATENT DOCUMENTS

GB 250471 A 4/1926

OTHER PUBLICATIONS

International Search Report and Written Opinion, dated Aug. 25, 2017, for corresponding International Application No. PCT/US2017/039523.

(Continued)

*Primary Examiner* — Jean F Duverne
(74) *Attorney, Agent, or Firm* — Black, McCuskey, Souers & Arbaugh, LPA

(57) ABSTRACT

A mounting assembly for an electrical fixture has an upper unit and a lower unit. The upper unit includes a first portion of a detent mechanism and an upper contact for connection to a power source. The lower unit is configured for connection to an electrical fixture and includes a second portion of a detent mechanism and a lower contact for connection to the electrical fixture. When the lower unit engages the upper unit, the first portion and the second portion of the detent mechanism cooperate to releasably retain the upper unit and lower unit together and the upper contact and lower contact touch to create an electric pathway between the power source and the electrical fixture.

18 Claims, 16 Drawing Sheets

(56) References Cited

U.S. PATENT DOCUMENTS

| | | | |
|---|---|---|---|
| 6,692,309 B1 | 2/2004 | Kovacs | |
| 6,779,911 B2 * | 8/2004 | Chang | F21V 19/006 |
| | | | 362/147 |
| 6,884,103 B1 * | 4/2005 | Kovacs | H01R 33/08 |
| | | | 362/220 |
| 7,033,220 B1 | 4/2006 | Yang | |
| 8,210,859 B2 * | 7/2012 | Tiberghien | H01R 43/26 |
| | | | 439/135 |
| 2002/0163812 A1 * | 11/2002 | Tseng | F04D 25/088 |
| | | | 362/404 |

OTHER PUBLICATIONS

International Search Report for the corresponding PCT Application; 15 pages.
GB 250,471 Patent Specification; 3 pages.

* cited by examiner

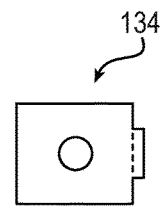
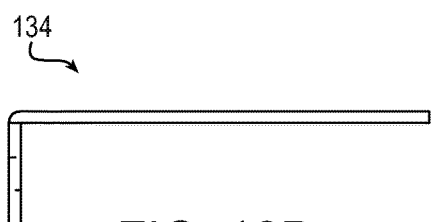
FIG. 12A    FIG. 12B
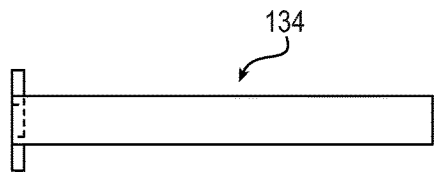
FIG. 12C
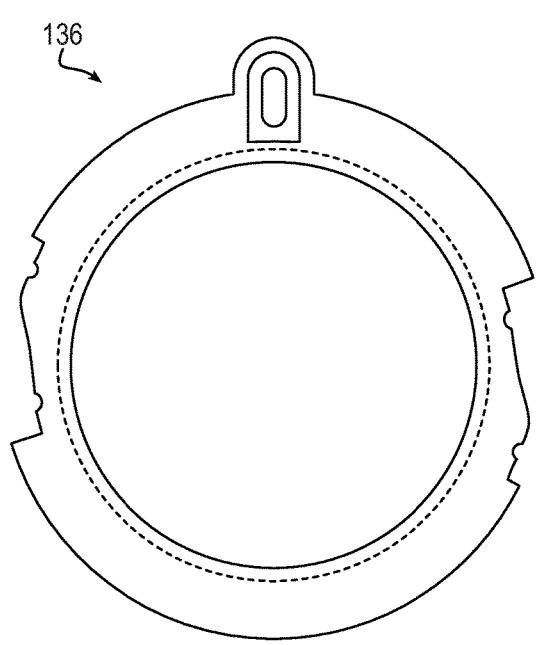 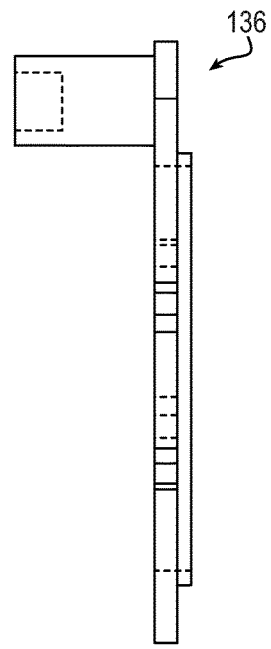
FIG. 13A    FIG. 13B

MOUNTING ASSEMBLY FOR AN ELECTRICAL FIXTURE

CROSS-REFERENCE TO RELATED APPLICATIONS

This application claims priority to and the benefit of U.S. Provisional Patent Application No. 62/355,321, filed Jun. 27, 2016, the contents of which are hereby incorporated by reference in their entirety.

BACKGROUND

This relates in general to mounting of electrical fixtures. There are many known types of electrical fixtures that are mounted to structures, such as houses, buildings, and the like. Such fixtures include lighting fixtures, appliances (e.g. fans), low voltage equipment (e.g. smoke detectors), etc. Generally, when mounting these types of fixtures, the fixtures are electrically connected, such as to the structure's central power network or as part of a larger electrical system, such as an alarm system or other powered system. These fixtures are then typically secured mechanically to the structure either directly to support members or to other articles such as electrical boxes. When mounting, an installer often needs to support the electrical fixture while implementing the electrical connection(s), and subsequently attempting to mechanically align and secure the fixture. For larger fixtures, it may be desirable to utilize two or more installers.

SUMMARY

This relates more particularly to a mounting assembly for an electrical fixture.

The mounting assembly for an electrical fixture has an upper unit and a lower unit. The upper unit includes a first portion of a detent mechanism and an upper contact for connection to a power source. The lower unit is configured for connection to an electrical fixture and includes a second portion of a detent mechanism and a lower contact for connection to the electrical fixture. When the lower unit engages the upper unit, the first portion and the second portion of the detent mechanism cooperate to releasably retain the upper unit and lower unit together and the upper contact and lower contact touch to create an electric pathway between the power source and the electrical fixture.

The upper unit and the lower unit may be formed to couple in a male-female relationship. In a preferred embodiment, the upper unit is female and the lower unit is male. Preferable, electrical and mechanical connection between the upper and lower units may be achieved over a range of insertion depths. In at least one embodiment, the lower unit is formed in tapered male fashion to facilitate self-alignment when inserting into the upper unit formed in a female fashion. Electrical contact components may be keyed to insure proper matching of multiple connections.

The power source may be an AC power source or a DC power source.

The upper unit may be configured for connection to an electrical box.

The first portion of the detent mechanism may include at least one finger for engaging the second portion of the detent mechanism. The upper unit may include a collet ring that engages the at least one finger to maintain the retention of the upper unit and lower unit together. The upper unit may further include a locking slide to adjust the position of the collet ring and allow for the upper and lower unit to be disengaged via a mechanism accessible after installation.

The first and second portions of the detent mechanism may include cooperating teeth for retention of the upper unit and lower unit together, preferably over a range of insertion depths.

The upper unit may include multiple upper contacts for connection to the power source, to a neutral or return line, or to ground and the lower unit may include multiple lower contacts for connection to the electrical fixture that respectively touch each other to create electric pathways between the power source, the neutral or return line, or ground and the electrical fixture when the lower unit is in engagement with the upper unit.

The upper unit may include a longitudinal cavity and the lower unit may include a longitudinal protrusion. The longitudinal protrusion disposed within the longitudinal cavity when the upper unit and lower unit are retained together. One of the longitudinal protrusion and the longitudinal cavity may include one or more splines and the other of the longitudinal protrusion and the longitudinal cavity may include one or more grooves. The splines disposed within the grooves when the upper unit and lower unit are retained together.

The upper contacts and the lower contacts may be disposed on the splines or disposed in the grooves. Preferably, the splines and groves are oriented in a fashion to prevent mis-matching of electrical contacts when the lower and upper unit are engaged. The upper and lower contacts are preferably formed to maintain electrical connection over a range of insertion depths between the upper and lower unit.

The assembly may include a cap disposed adjacent to the upper unit and opposite the lower unit.

The assembly may include a spacer disposed between the lower unit and the electrical fixture.

Various aspects will become apparent to those skilled in the art from the following detailed description and the accompanying drawings.

BRIEF DESCRIPTION OF THE DRAWINGS

FIG. 5a is a cross sectional view of the upper unit of FIG. 2 taken along line 5a-5a.

FIG. 9a is a cross sectional view of the lower unit of FIG. 6 taken along line 9a-9a.

FIG. 10b is a side view of the locking slide of FIG. 10a.

FIG. 10c is an end view of the locking slide of FIG. 10a.

FIG. 11b is a side view of the upper contact of FIG. 11a.

FIG. 11c is a front view of the upper contact of FIG. 11a.

FIG. 12a is a top view of a lower contact of the lower unit of the assembly of FIG. 1.

FIG. 12b is a side view of the lower contact of FIG. 12a.

FIG. 12c is a front view of the lower contact of FIG. 12a.

FIG. 13a is a bottom view of the locking ring of the upper unit of the assembly of FIG. 1.

FIG. 13b is a side view of the locking ring of FIG. 13a.

DETAILED DESCRIPTION

Figure 1:
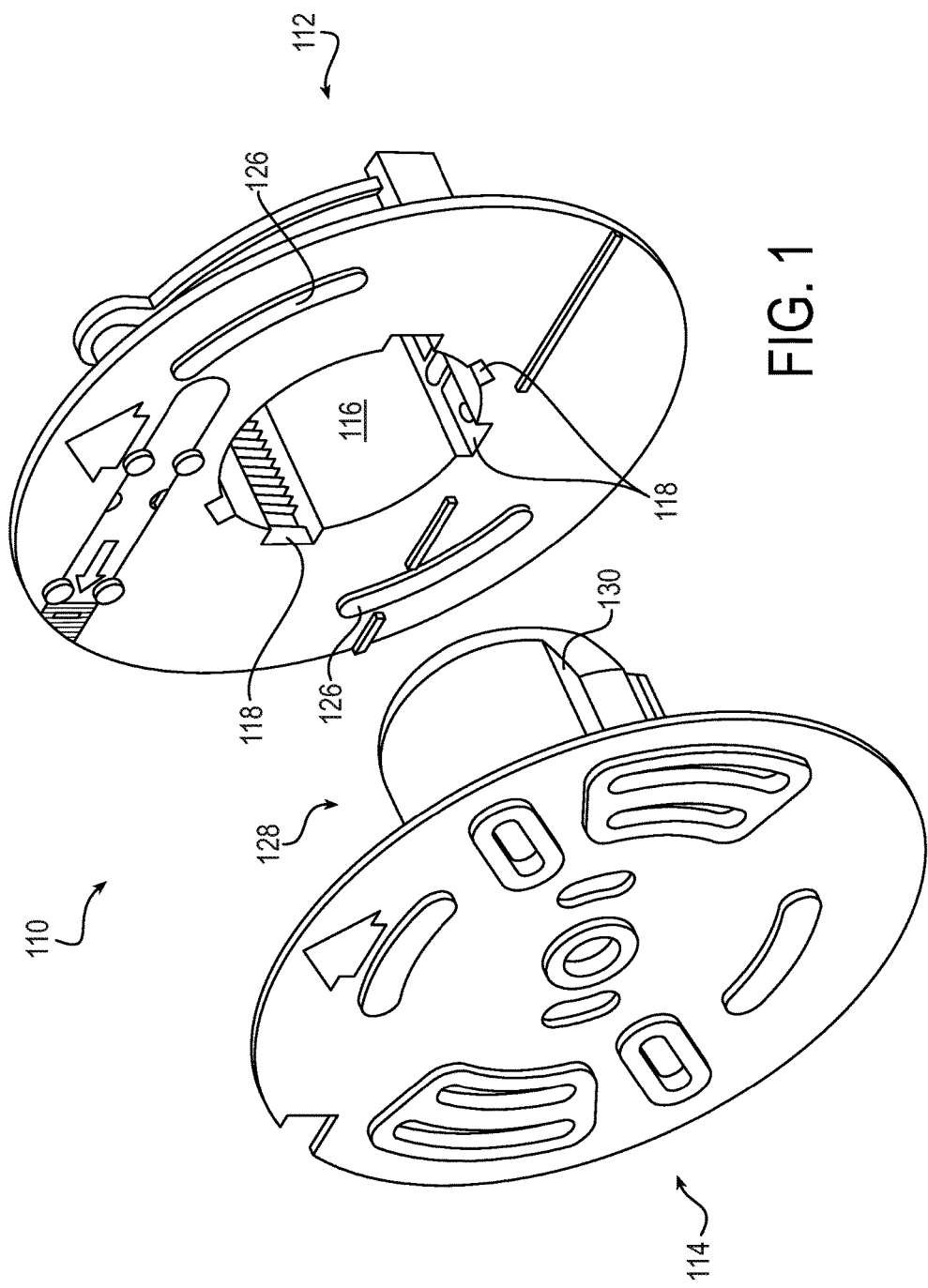
FIG. 1 is a perspective partially exploded view of a mounting assembly.
Figure 2:
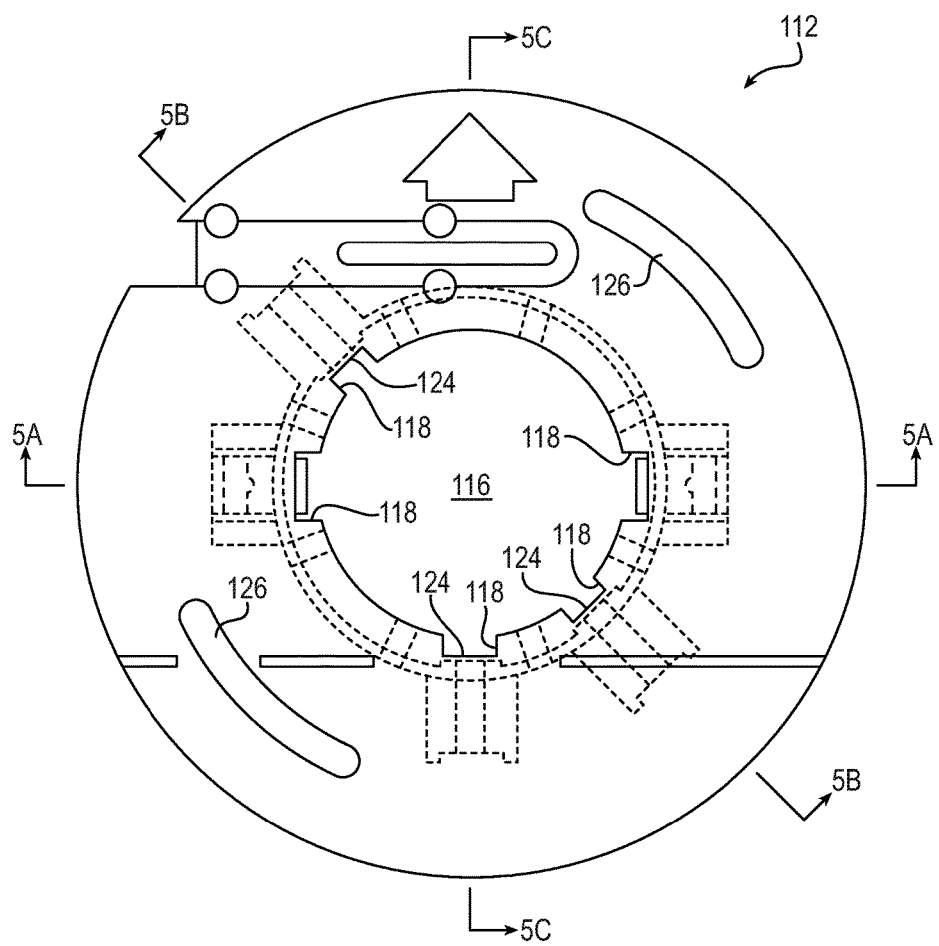
FIG. 2 is a bottom view of the upper unit of the assembly of FIG. 1.
Figure 3:
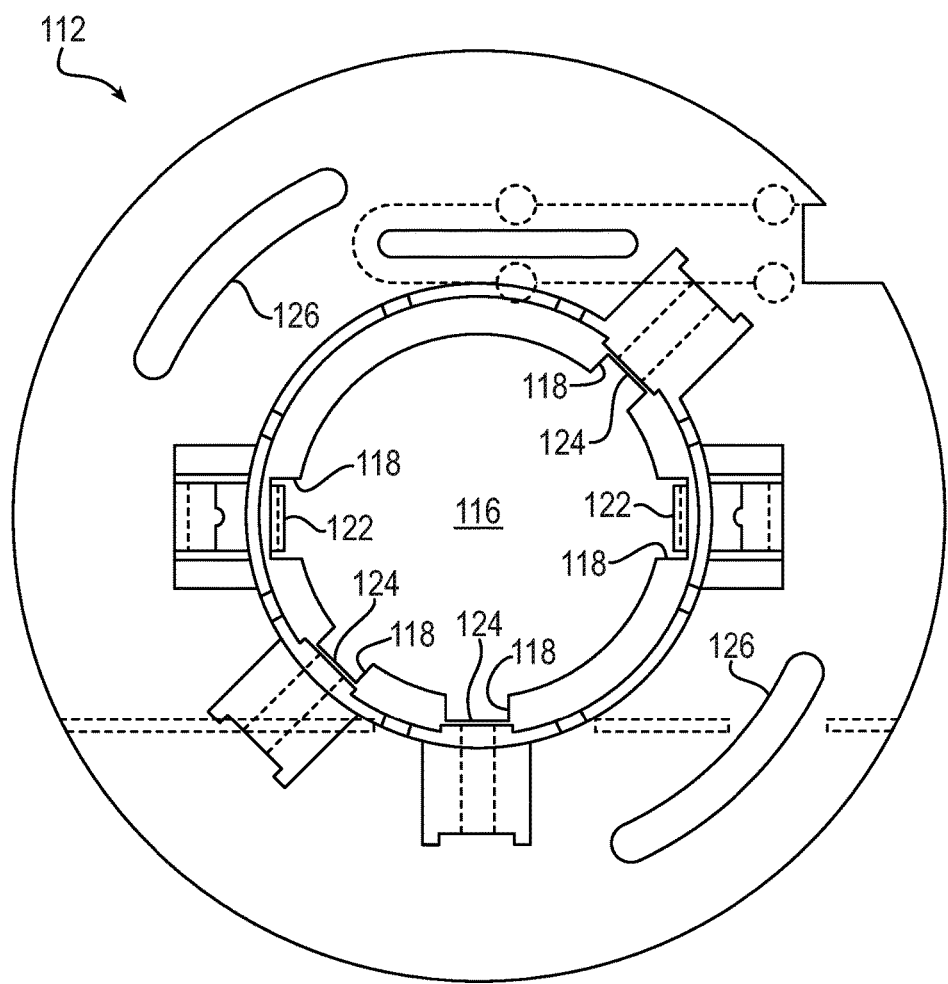
FIG. 3 is a top view of the upper unit of FIG. 2.
Figure 4:
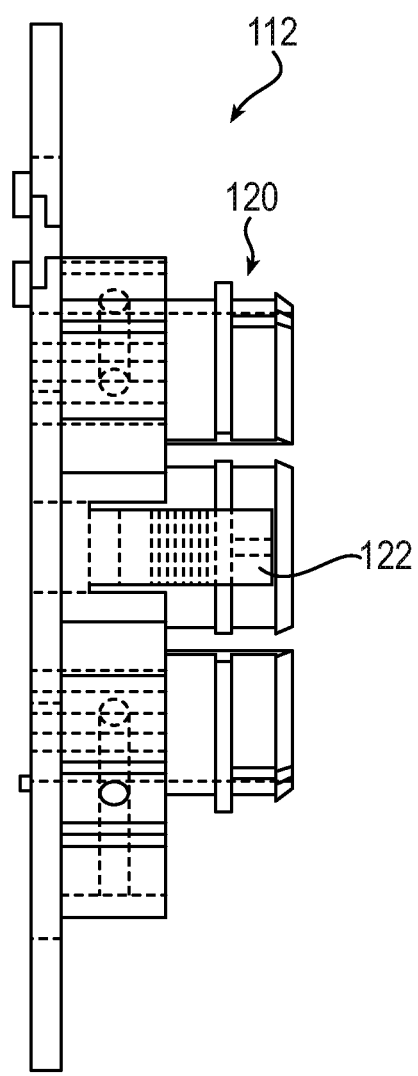
FIG. 4 is a side view of the upper unit of FIG. 2.
Figure 5C:
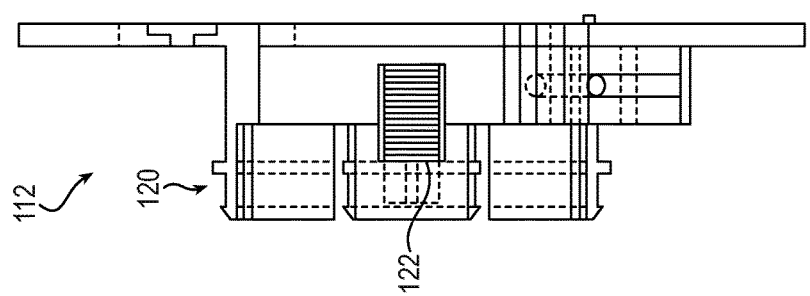
FIG. 5c is a cross sectional view of the upper unit of FIG. 2 taken along line 5c-5c.
Figure 5B:
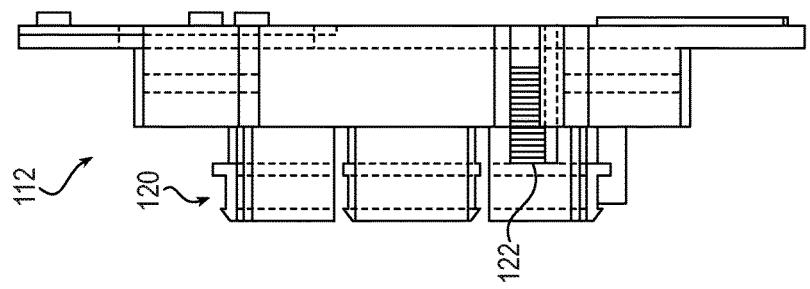
FIG. 5b is a cross sectional view of the upper unit of FIG. 2 taken along line 5b-5b.
Figure 5A:
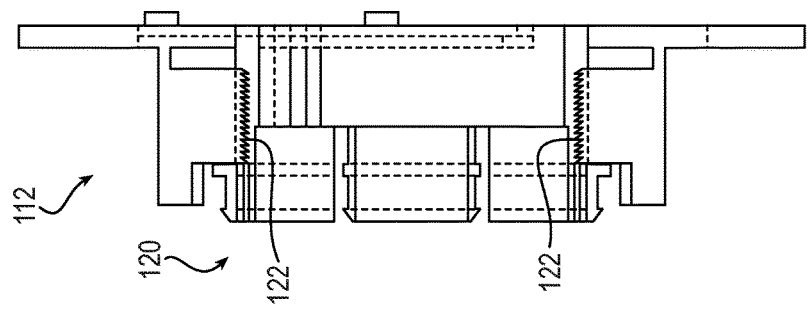
Figure 6:
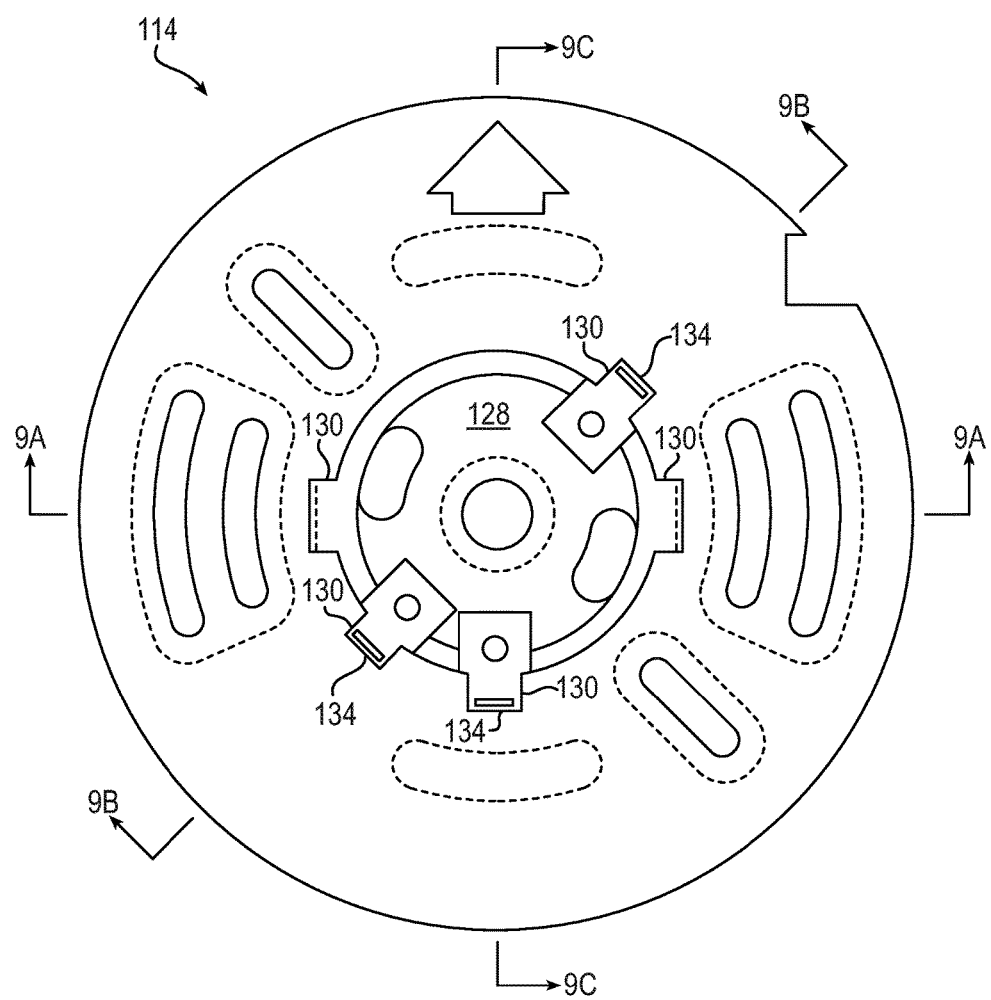
FIG. 6 is a top view of the lower unit of the assembly of FIG. 1.
Figure 7:
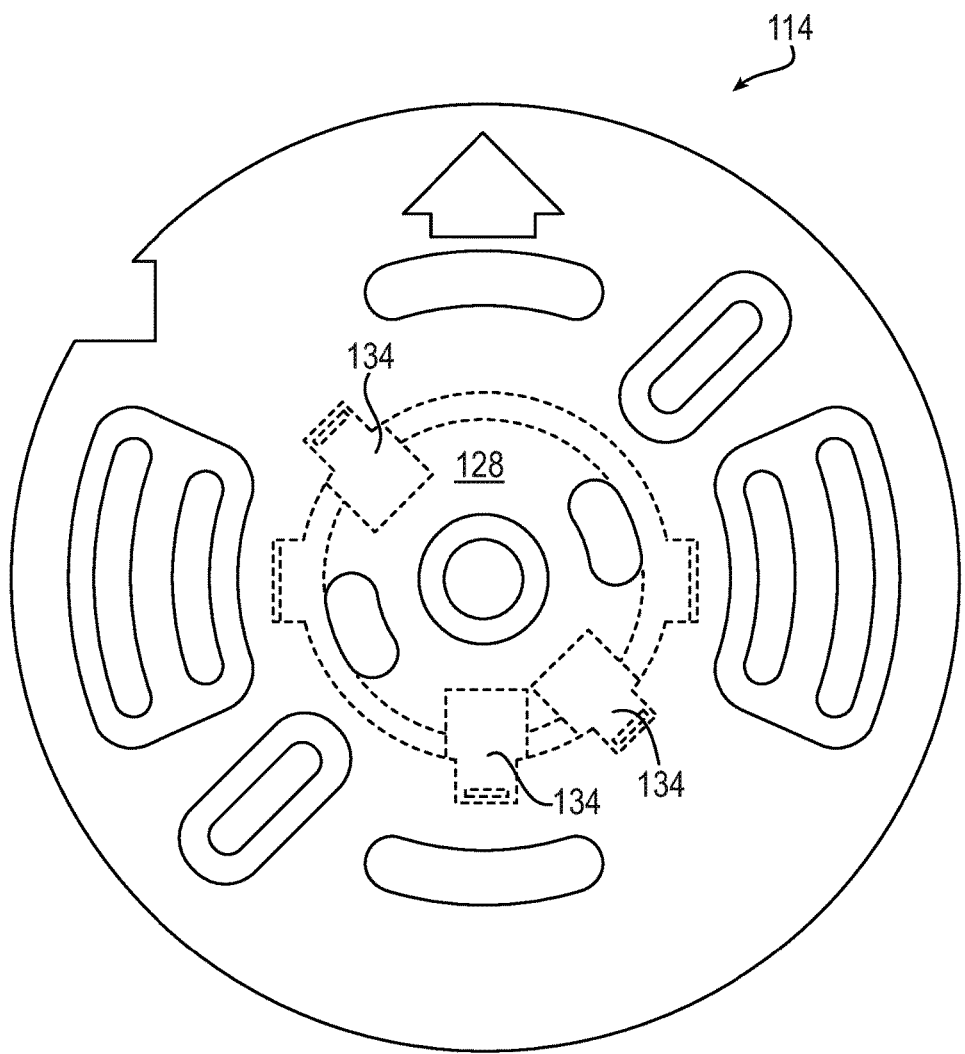
FIG. 7 is a bottom view of the lower unit of FIG. 6.
Figure 8:
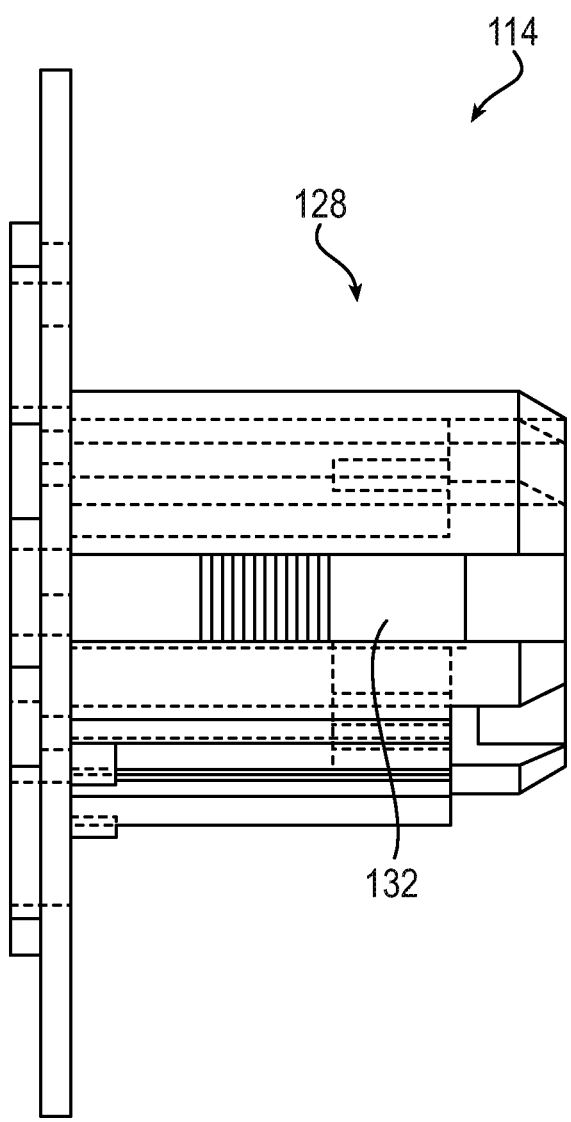
FIG. 8 is a side view of the lower unit of FIG. 6.
Figure 9B:
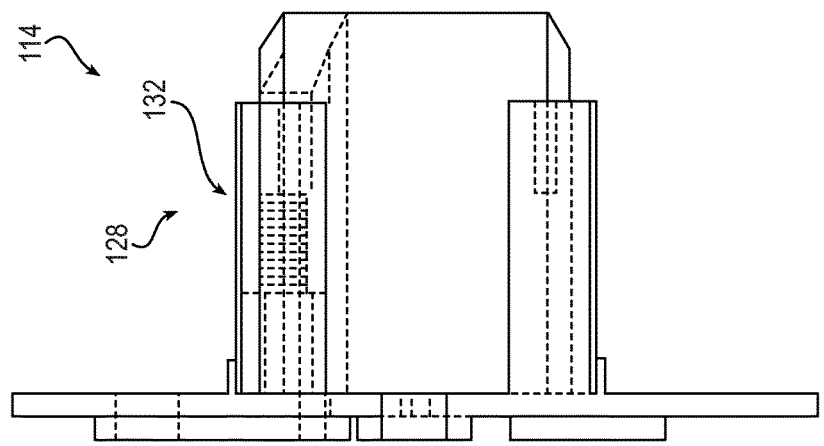
FIG. 9b is a cross sectional view of the lower unit of FIG. 6 taken along line 9b-9b.
Figure 9A:
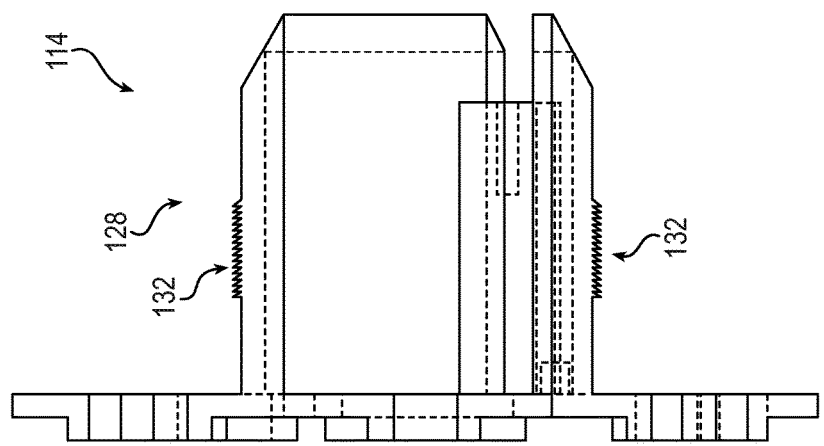
Figure 9C:
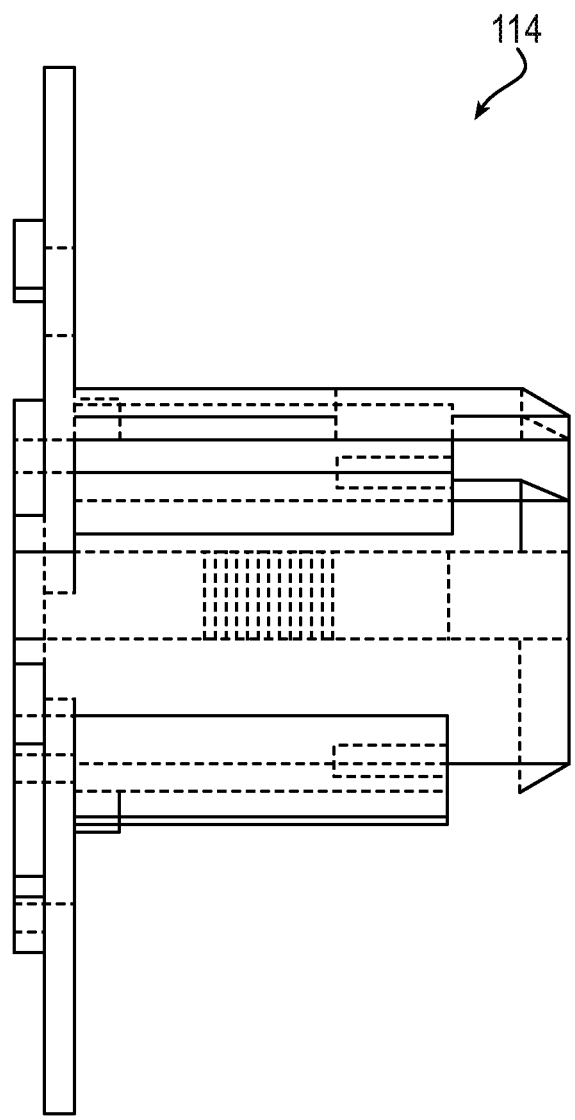
FIG. 9c is a cross sectional view of the lower unit of FIG. 6 taken along line 9c-9c.
Figure 10A:
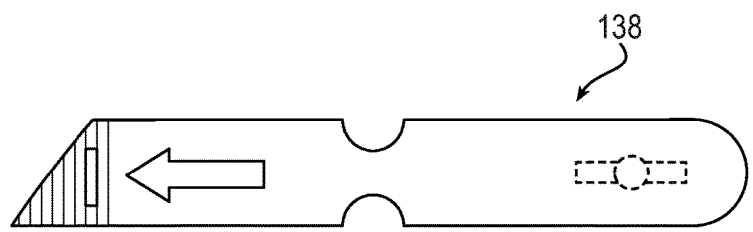
FIG. 10a is a bottom view of the locking slide of the upper unit of the assembly of FIG. 1.
Figure 10B:
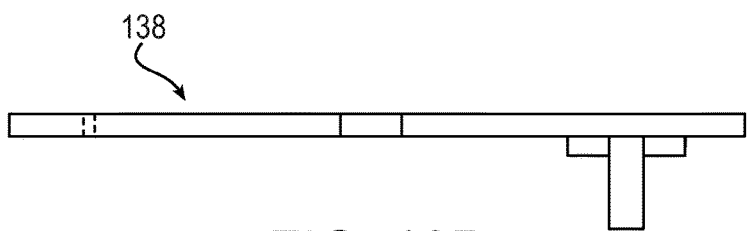
Figure 10C:
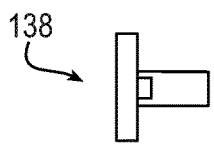
Figure 11A:
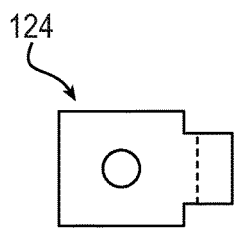
FIG. 11a is top view of an upper contact of the upper unit of the assembly of FIG. 1.
Figure 11B:
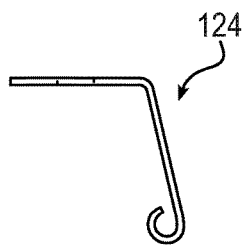
Figure 11C:
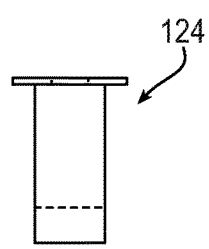

Referring now to the drawings, there is illustrated a mounting assembly 110 for an electrical fixture (not shown). The assembly 110 includes an upper unit 112 and a lower unit 114.

The upper unit 112 includes a longitudinal cavity 116, the purpose of which will be discussed below. The cavity 116 may be tapered along the longitudinal axis. The cavity 116 includes optional longitudinal grooves 118.

The upper unit 112 includes a first portion 120 of a detent mechanism, the purpose of which will be discussed below. The first portion 120 of the detent mechanism includes at least one finger 122.

The upper unit 112 includes at least one upper contact 124 for connection to a power source, a neutral or ground connection. The power source may be an AC power source or a DC power source.

The upper contacts 124 are illustrated as each being disposed in a respective groove 118.

The upper unit 112 is configured for connection to an electrical box, not shown. For example, the upper unit 112 includes apertures 126 configured for attachment to a corresponding electrical box or other mounting arrangement.

The lower unit 114 includes a longitudinal protrusion 128. The longitudinal protrusion 128 is disposed within the longitudinal cavity 116 when the upper unit 112 and lower unit 114 are retained together. The longitudinal protrusion 128 may be tapered.

The longitudinal protrusion includes optional splines 130. The spines are each disposed within a respective groove 118 when the upper unit 112 and lower unit 114 are retained together.

The lower unit 114 includes a second portion 132 of the detent mechanism. When the lower unit 114 engages the upper unit 112, the first portion 120 and the second portion 132 of the detent mechanism cooperate to releasably retain the upper unit and lower unit together, for example with a ratchet mechanism, such as an engaging tooth mechanism, or any other suitable mechanism to releasably retain the upper unit and lower unit together.

The lower unit 114 also includes at least one lower contact 134 for connection to an electrical fixture, not shown. When the lower unit 114 engages the upper unit 112 each upper contact 124 and lower contact 134 touch to create a electric pathway between the power source, neutral or ground and the electrical fixture.

As illustrated, each lower contact is disposed on a respective spline 130. However, it must be understood that the lower unit 114 may include grooves and the upper unit 112 may include splines with lower contacts disposed in grooves and upper contacts disposed on splines.

In the present example, when the upper unit 112 and the lower unit 114 are retained together the fingers 122 of the first portion 120 of the detent mechanism engage the second portion 132 of the detent mechanism. As illustrated, the first and second portions 120 and 132 of the detent mechanism include cooperating teeth for retention of the upper unit 112 and lower unit together 114.

A collet ring 136 engages at least one finger 122 to maintain the retention of the upper unit 112 and lower unit together 114. The assembly 110 also includes a locking slide 138 to adjust the position of the collet ring 136.

Figure 14:
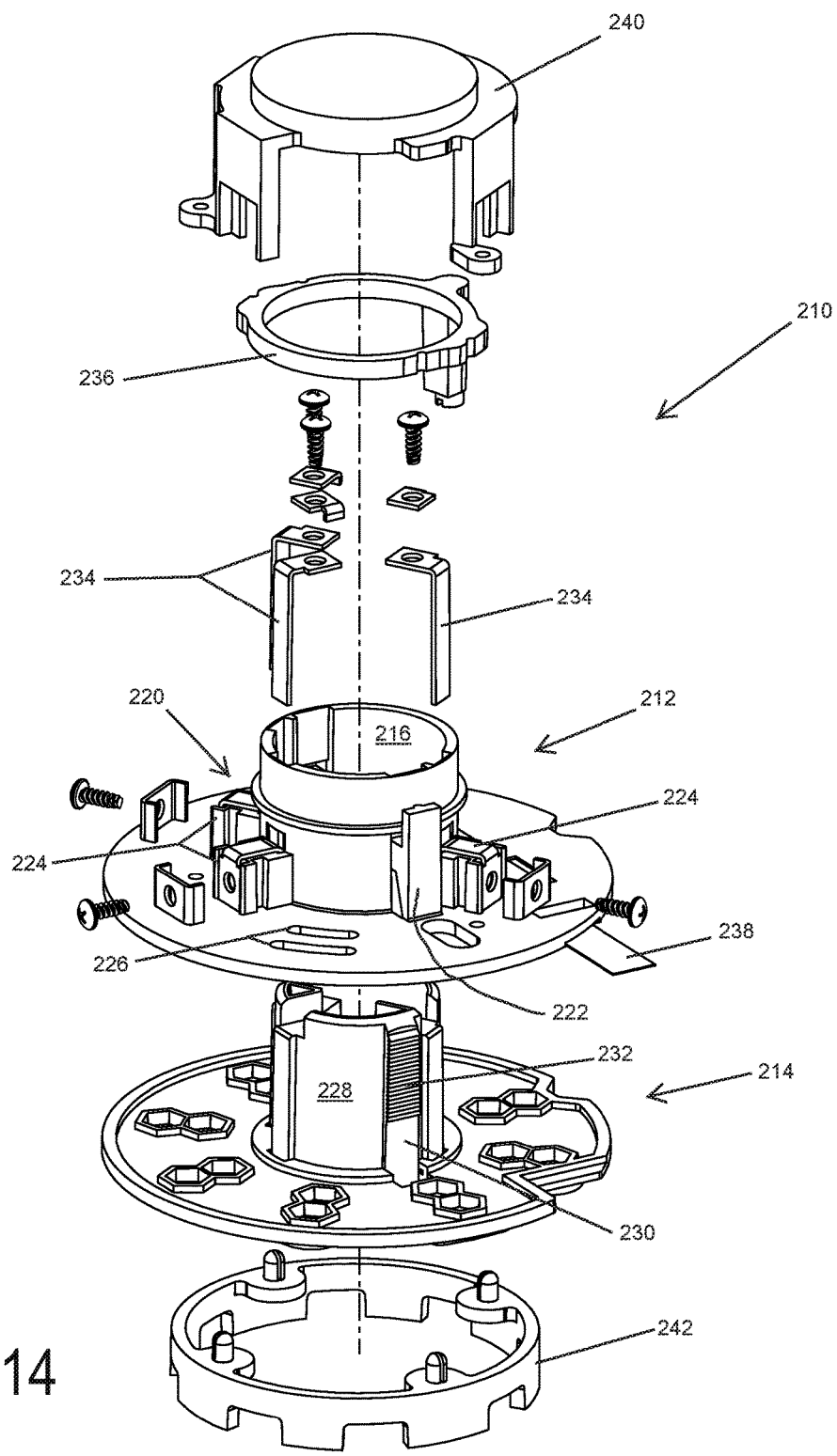
FIG. 14 is an exploded view of a mounting assembly according to another embodiment.

There is shown in FIGS. 14-19, with particular focus on FIG. 14, a mounting assembly 210 according to another embodiment. Components similar to components shown in FIGS. 1-13 have been labeled with similar identifiers.

The assembly 210 includes an upper unit 212 and a lower unit 214.

Figure 16:
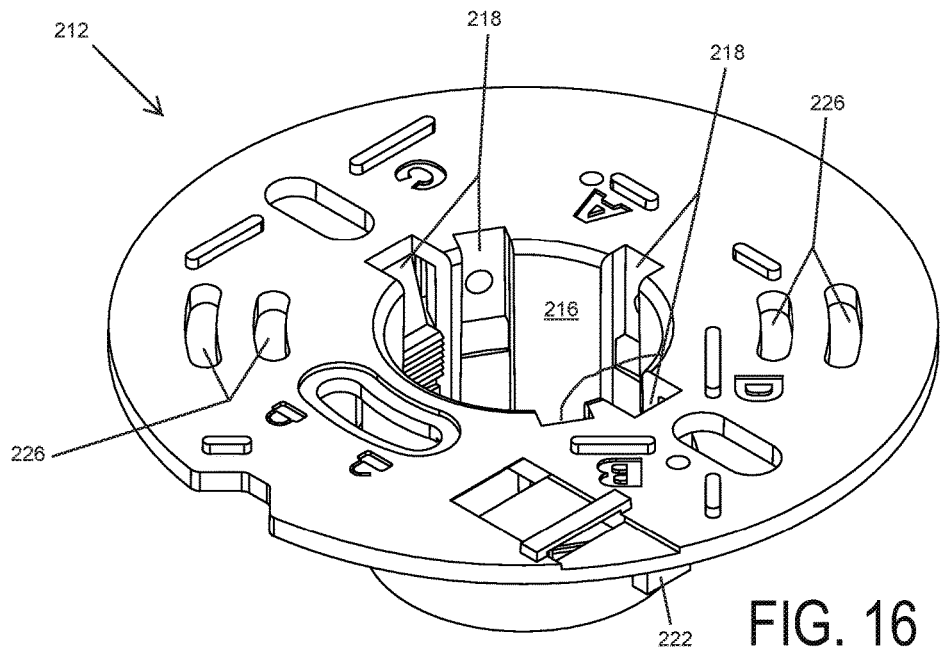
FIG. 16 is a bottom perspective view of the upper unit of FIG. 14.

The upper unit 212, also shown in FIG. 16 includes a longitudinal cavity 216. The cavity 216 may be tapered along the longitudinal axis. The cavity 216 includes optional longitudinal grooves 218.

The upper unit 212 includes a first portion 220 of a detent mechanism. The first portion 220 of the detent mechanism includes at least one finger 222.

The upper unit 212 includes at least one upper contact 224 for connection to a power source, a neutral or ground connection. The power source may be an AC power source or a DC power source.

The upper contacts 224 are illustrated as each being disposed in a respective groove 218. The upper contacts 224 are shown with optional associated clamp connectors with screws to facilitate connection of the power source, neutral, or ground connection.

The upper unit 212 is configured for connection to an electrical box, not shown. For example, the upper unit 212 includes apertures 226 configured for attachment to a corresponding electrical box or other mounting arrangement.

Figure 15:
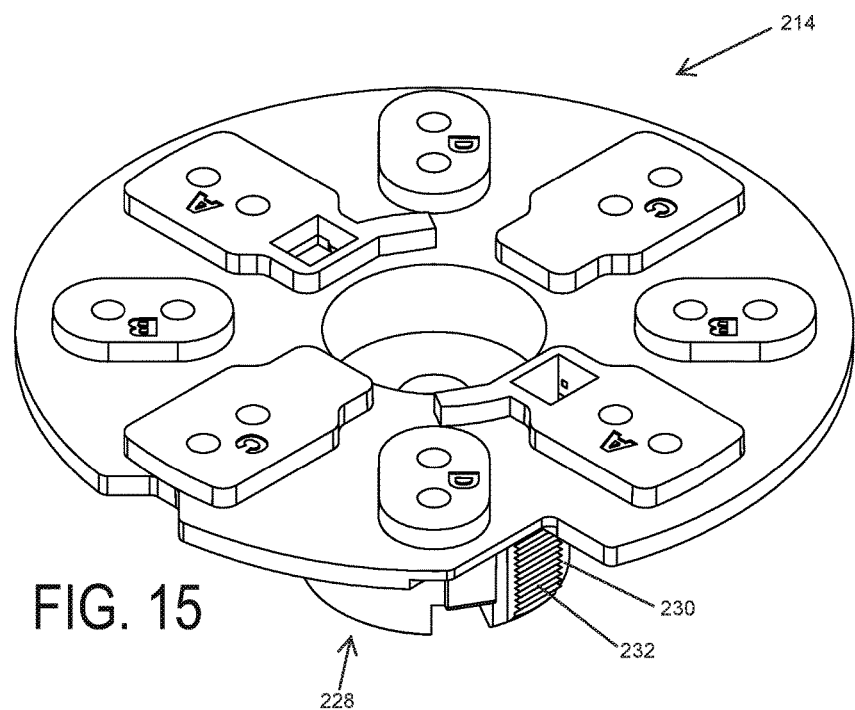
FIG. 15 is a bottom perspective view of the lower unit of FIG. 14.

The lower unit 214, also shown in FIG. 15, includes a longitudinal protrusion 228. The longitudinal protrusion 228 is disposed within the longitudinal cavity 216 when the upper unit 212 and lower unit 214 are retained together. The longitudinal protrusion 228 may be tapered.

The longitudinal protrusion includes optional splines 230. The spines are each disposed within a respective groove 218 when the upper unit 212 and lower unit 214 are retained together.

The lower unit 214 includes a second portion 232 of the detent mechanism. When the lower unit 214 engages the upper unit 212, the first portion 220 and the second portion 232 of the detent mechanism cooperate to releasably retain the upper unit and lower unit together, for example with a ratchet mechanism, such as an engaging tooth mechanism, or any other suitable mechanism to releasably retain the upper unit and lower unit together.

The lower unit 214 includes several pairs of apertures, labeled A, B, C, and D, to provide for the mounting of an electrical fixture, not shown, to the lower unit 214. The apertures A, B, C, and D, are provided such that fixtures of varying connections may be mated to the lower unit in appropriate configurations.

The lower unit 214 also includes at least one lower contact 234 for connection to the electrical fixture. When the lower unit 214 engages the upper unit 212 each upper contact 224 and lower contact 234 touch to create an electric pathway between the power source, neutral or ground and the electrical fixture. The lower contacts 234 are shown with optional associated clamp connectors with screws to facilitate connection of the electrical fixture lower contacts 234 for connection to the pathway to the power source, neutral, or ground connection.

As illustrated, each lower contact is disposed on a respective spline 230. However, it must be understood that the lower unit 214 may include grooves and the upper unit 212 may include splines with lower contacts disposed in grooves and upper contacts disposed on splines.

In the present example, when the upper unit 212 and the lower unit 214 are retained together the fingers 222 of the first portion 220 of the detent mechanism engage the second portion 232 of the detent mechanism. As illustrated, the first and second portions 220 and 232 of the detent mechanism include cooperating teeth for retention of the upper unit 212 and lower unit together 214.

Figure 18:
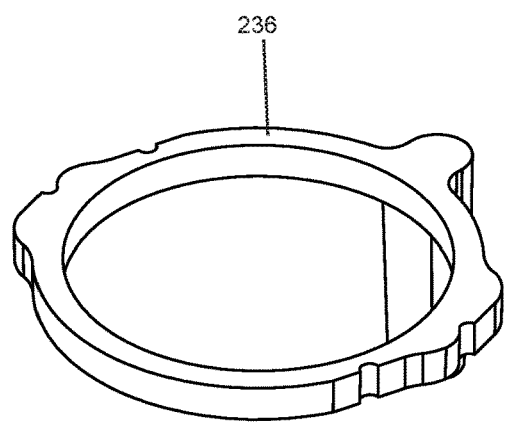
FIG. 18 is a top perspective view of the locking ring of FIG. 14.

A collet ring 236, also shown in FIG. 18, engages at least one finger 222 to maintain the retention of the upper unit 212 and lower unit together 214. The assembly 210 also includes a locking slide 238' to adjust the position of the collet ring 236. The locking slide 238' includes a pull strap. The pull strap is flexible and made from clear polyester, although such is not required. The strap may be used to move the locking slide 238'. In at least one exemplary installation, the strap may be tucked under the lower unit 214 to minimize the amount of strap extending from the assembly 210. In another exemplary installation, the strap may be cut or trimmed to diminish the extent to which the strap extends from the assembly 210.

Figure 17:
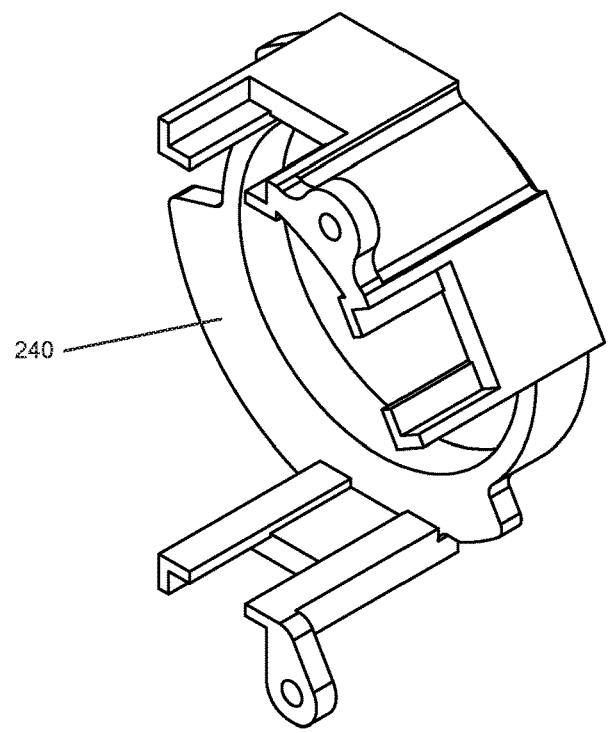
FIG. 17 is a side perspective view of the cap of FIG. 14.

The assembly 210 further includes an optional cap 240, also shown in FIG. 17. In at least one arrangement, the cap 240 provides a barrier at the end of the assembly to insulate the connectors 224 and 234 from something that may be beyond the cap 240. Further, in at least one other arrangement, the cap 240 may cover or protect some of the parts, for example particularly the moving parts, of the assembly 210, from something that may be beyond the cap 240.

Figure 19:
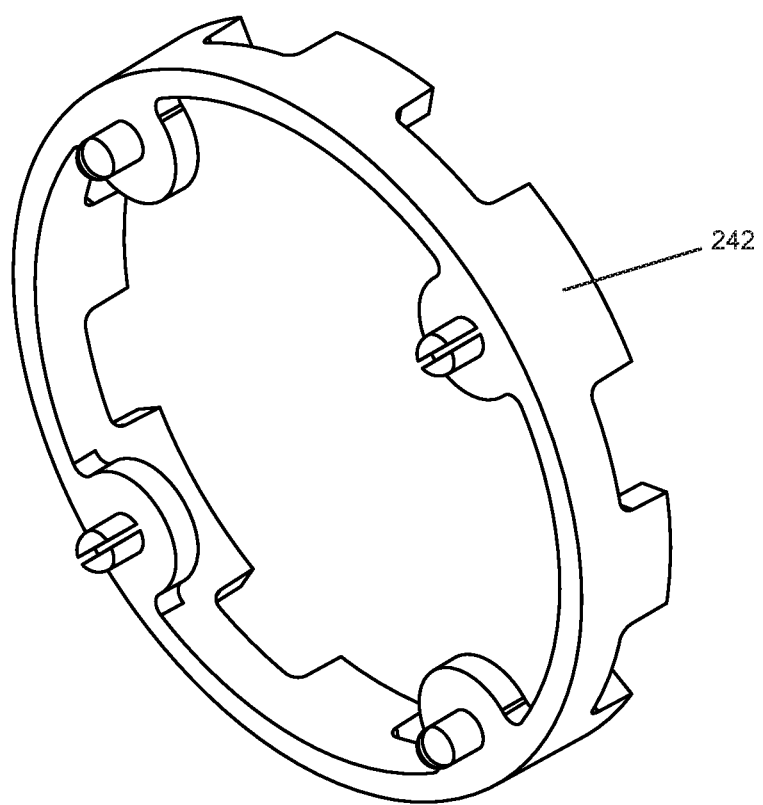
FIG. 19 is a side perspective view of the spacer of FIG. 14.

The assembly 210 also includes an optional spacer 242, also shown in FIG. 19. The spacer 242 include optional prongs to engage with the apertures A, B, C, D. In one exemplary installation, the spacer 242 is disposed between the lower unit 214 and the electrical fixture to position the electrical fixture in a desired location relative to the assembly 210.

It must be understood that the assemblies 110 or 210 may be produced in a variety of detentions including several depths in profile. For example an assembly 110 or 210 may be produced to fit a variety of electrical boxes, such as what is commonly known as a standard box, deep box, or shallow box.

While principles and modes of operation have been explained and illustrated with regard to particular embodiments, it must be understood, however, that this may be practiced otherwise than as specifically explained and illustrated without departing from its spirit or scope.

What is claimed is:

1. A mounting assembly for an electrical fixture comprising:
    an upper unit including a first portion of a detent mechanism and an upper contact for connection to a power source; and
    a lower unit configured for connection to an electrical fixture and including a second portion of a detent mechanism and a lower contact for connection to the electrical fixture;
    where when the lower unit engages the upper unit the first portion and the second portion of the detent mechanism cooperate to releaseably retain the upper unit and lower unit together and the upper contact and lower contact touch to create an electric pathway between the power source and the electrical fixture;
    where the first portion of the detent mechanism includes at least one finger for engaging the second portion of the detent mechanism; and
    where the upper unit further includes a collet ring that engages the at least one finger to maintain the retention of the upper unit and lower unit together.

2. The assembly of claim 1 where the upper unit is configured for connection to an electrical box.

3. The assembly of claim 1 where the upper unit further includes a locking slide to adjust the position of the collet ring.

4. The assembly of claim 1 where the first and second portions of the detent mechanism include cooperating teeth for retention of the upper unit and lower unit together.

5. The assembly of claim 1 where the upper unit further includes a second upper contact for connection to a power source and the lower unit further includes a second lower contact for connection to the electrical fixture, where when the lower unit engages the upper unit the second upper contact and the second lower contact touch to create a second electric pathway between the power source and the electrical fixture.

6. The assembly of claim 1 where the power source is an AC power source.

7. The assembly of claim 1 where the power source is a DC power source.

8. The assembly of claim 1 further comprising a cap disposed adjacent to the upper unit and opposite the lower unit.

9. The assembly of claim 1 further comprising a spacer disposed between the lower unit and the electrical fixture.

10. A mounting assembly for an electrical fixture comprising:
    an upper unit including a first portion of a detent mechanism and an upper contact for connection to a power source; and
    a lower unit configured for connection to an electrical fixture and including a second portion of a detent mechanism and a lower contact for connection to the electrical fixture;
    where when the lower unit engages the upper unit the first portion and the second portion of the detent mechanism cooperate to releaseably retain the upper unit and lower unit together and the upper contact and lower contact touch to create an electric pathway between the power source and the electrical fixture; and
    where the upper unit further includes a second upper contact for a neutral or ground connection and the lower unit further includes a second lower contact for connection to the electrical fixture, where when the lower unit engages the upper unit the second upper contact and the second lower contact touch to create a second electric pathway between the ground or neutral and the electrical fixture.

11. A mounting assembly for an electrical fixture comprising:
  an upper unit including a first portion of a detent mechanism and an upper contact for connection to a power source; and
  a lower unit configured for connection to an electrical fixture and including a second portion of a detent mechanism and a lower contact for connection to the electrical fixture;
  where when the lower unit engages the upper unit the first portion and the second portion of the detent mechanism cooperate to releaseably retain the upper unit and lower unit together and the upper contact and lower contact touch to create an electric pathway between the power source and the electrical fixture; and
  where the upper unit includes a longitudinal cavity and the lower unit includes a longitudinal protrusion, where the longitudinal protrusion is disposed within the longitudinal cavity when the upper unit and lower unit are retained together.

12. The assembly of claim 11 where one of the longitudinal protrusion and the longitudinal cavity includes a spline and the other of the longitudinal protrusion and the longitudinal cavity includes a groove, where the spine is disposed within the groove when the upper unit and lower unit are retained together.

13. The assembly of claim 12 where the upper contact is one of disposed on the spline and disposed in the groove and where the lower contact is the other of disposed on the spline and disposed in the groove.

14. The assembly of claim 12 where one of the longitudinal protrusion and the longitudinal cavity includes a second spline and the other of the longitudinal protrusion and the longitudinal cavity includes a second groove, where the second spline is disposed within the second groove when the upper unit and lower unit are retained together.

15. The assembly of claim 13 where one of the longitudinal protrusion and the longitudinal cavity includes a second spline and the other of the longitudinal protrusion and the longitudinal cavity includes a second groove, where the second spline is disposed within the second groove when the upper unit and lower unit are retained together;
  where the upper unit further includes a second upper contact for connection to a power source and the lower unit further includes a second lower contact for connection to the electrical fixture, where when the lower unit engages the upper unit the second upper contact and the second lower contact touch to create a second electric pathway between the power source and the electrical fixture; and
  where the second upper contact is one of disposed on the second spline and disposed in the second groove and where the second lower contact is the other of disposed on the second spline and disposed in the second groove.

16. The assembly of claim 13 where one of the longitudinal protrusion and the longitudinal cavity includes a second spline and the other of the longitudinal protrusion and the longitudinal cavity includes a second groove, where the second spline is disposed within the second groove when the upper unit and lower unit are retained together;
  where the upper unit further includes a second upper contact for a neutral or ground connection and the lower unit further includes a second lower contact for connection to the electrical fixture, where when the lower unit engages the upper unit the second upper contact and the second lower contact touch to create a second electric pathway between the ground or neutral and the electrical fixture; and
  where the second upper contact is one of disposed on the second spline and disposed in the second groove and where the second lower contact is the other of disposed on the second spline and disposed in the second groove.

17. The assembly of claim 11 where the longitudinal protrusion is tapered.

18. The assembly of claim 13 where the longitudinal protrusion is tapered.

\* \* \* \* \*